United States Patent [19]
Tapolsky et al.

[11] Patent Number: 6,001,958
[45] Date of Patent: Dec. 14, 1999

[54] CROSSLINKABLE POLYMER, PARTICULARLY FOR OPTICAL AND NON-LINEAR OPTICAL USE, MATERIALS OR DEVICES USING SAME, AND METHOD FOR PREPARING SAID POLYMER

[75] Inventors: Gilles Hugues Tapolsky, St Genis Laval; You Ping Chan, Lyons; Rémi Meyrueix, Lyons; Jean-Pierre Lecomte, Lyons; Michael Dickens, Lyons, all of France

[73] Assignee: Flamel Technologies, Venissieux Cedex, France

[21] Appl. No.: 08/557,168

[22] PCT Filed: Jun. 24, 1994

[86] PCT No.: PCT/FR94/00767

§ 371 Date: Oct. 28, 1996

§ 102(e) Date: Oct. 28, 1996

[87] PCT Pub. No.: WO95/00571

PCT Pub. Date: Jan. 5, 1995

[30] Foreign Application Priority Data

Jun. 25, 1993 [FR] France .................... 93 08027

[51] Int. Cl.$^6$ .......................... C08G 63/00; C08G 65/00; C08G 73/00; C08G 75/00
[52] U.S. Cl. .................. 528/360; 528/10; 528/44; 528/60; 528/73; 528/75; 528/82; 528/100; 528/170; 528/171; 528/172; 528/173; 528/272; 528/289; 528/310; 528/363; 528/406; 526/211; 526/213; 428/423.1
[58] Field of Search ................. 528/10, 44, 60, 528/73, 75, 82, 100, 272, 363, 360, 289, 171, 172, 173, 406, 170, 310; 526/211, 213; 428/423.1

[56] References Cited

U.S. PATENT DOCUMENTS

| | | | |
|---|---|---|---|
| 4,985,528 | 1/1991 | Mignani et al. | 528/59 |
| 5,075,409 | 12/1991 | Barthelemy et al. | 528/85 |
| 5,098,982 | 3/1992 | Long, II | 528/75 |

FOREIGN PATENT DOCUMENTS

| | | |
|---|---|---|
| A-0 401 063 | 12/1990 | European Pat. Off. . |
| A-0 422 500 | 4/1991 | European Pat. Off. . |
| A-0 445 864 | 9/1991 | European Pat. Off. . |
| A-0 524 865 | 1/1993 | European Pat. Off. . |

OTHER PUBLICATIONS

Kitipichai et al., *Journal of Polymer Science*, Part A: Polymer Chemistry, vol. 31, No. 6, May 1993, New York, New York, pp. 1365–1375.

*Primary Examiner*—P. Hampton-Hightower
*Attorney, Agent, or Firm*—Bacon & Thomas, PLLC

[57] ABSTRACT

The invention relates to a crosslinkable polymer for use in optics and non-linear optics, which comprises at least one chromophore, characterized in that it has, on at least two of its ends, at least one reactive end group of a different chemical type from the group predominantly used in polymerization and the preparation of a polymer skeleton. Said reactive end group comprises at least one CC, CN, CS, SS or NS double bond and/or triple bond, and/or an epoxy group and/or a thiol group or a derivative of said groups, and the polymerization groups are selected from at least one of the following groups: urethane, ester, amide, imide, ether, carbon-carbon, sulfide, silane and siloxane, urethane and ester groups being particularly preferred. Application in optical and opto-electronic materials and devices.

20 Claims, No Drawings

CROSSLINKABLE POLYMER, PARTICULARLY FOR OPTICAL AND NON-LINEAR OPTICAL USE, MATERIALS OR DEVICES USING SAME, AND METHOD FOR PREPARING SAID POLYMER

TECHNICAL FIELD

The field of the present invention is that of materials which are capable of being used in optics and non-linear optics (NLO).

The present invention relates to novel organic compounds of a polymeric or copolymeric nature which are active inter alia in optics and/or non-linear optics.

More precisely, the invention relates to oligomers, co-oligomers, polymers and copolymers, hereafter designated arbitrarily by the common name of polymers, which comprise chromophoric compounds.

PRIOR ART

Another characteristic of the optical polymers to which the invention relates is an ability to cross-link and give more or less rigid and/or insoluble materials which can optionally be converted to film, for example, in order to produce optical devices.

The fact that these macromolecules behave like optically linear materials and/or optically non-linear materials is exploited in these optical and opto-electronic applications.

On the macroscopic scale, the optically linear or optically non-linear behavior of these materials is determined by the susceptibilities.

Said susceptibilities are directly related to the polarization of the material induced by an electromagnetic field E and governs by the following fundamental relationship:

$$P = P_o + \chi^1 E + \chi^2 EE + \chi^3 EEE + \ldots$$

in which:
P and $P_o$ are the polarization in the presence and, respectively, absence of electromagnetic field,
E is the electromagnetic field,
$\chi^1$ is the linear susceptibility,
$\chi^2$ and $\chi^3$ are the non-linear susceptibilities of the material.

The coefficient $\chi^1$ reflects the linear optical behavior of the material.

Filters, polarizers and waveguides are examples of components which utilize polymers for their linear optical behavior.

The coefficients $\chi^2$ and $\chi^3$ reflect the activity in non-linear optics of a first-order non-linear material and, respectively, a second-order non-linear material.

Materials active in non-linear optics are generally used in active components of the type comprising modulators, directional couplers, optical flip-flops, photoconductive films, etc.

The activity of these polymer materials in non-linear optics originates from the hyperpolarizable (or chromophoric) compounds they contain.

Chromophore must be understood as meaning any structural unit whose interaction with the electromagnetic field of light generates the desired optical effect.

This effect can take place at resonant or non-resonant wavelengths.

The activity of these chromophores in non-linear optics is given by their hyperpolarizability.

The latter is directly related to the molecular dipole moment by the following fundamental relationship:

$$\mu = \mu_o + \alpha F + \beta FF + \gamma FFF + \ldots$$

in which:
$\mu$ and $\mu_o$ are the dipole moments in the presence and, respectively, absence of electromagnetic field,
F is the local electromagnetic field,
$\alpha$ and $\beta$ are the coefficients of polarizability and hyperpolarizability.

The coefficient $\alpha$ is the coefficient of polarizability of the chromophoric molecule and reflects its activity in linear optics.

The coefficients $\beta$ and $\gamma$ are the first-order and, respectively, second-order coefficients of hyperpolarizability.

For a better understanding of the specifications imposed on optical and non-linear optical (NLO) polymers, it should be pointed out that linear or non-linear waveguides consist of several layers of polymers deposited successively one on top of the other on a substrate, for example by the spin coating technique.

The middle layer, with the highest index, constitutes the guiding material. The lateral confinement of the light in this layer of high index is effected by tracing a guide therein using techniques known to those skilled in the art, such as, for example, molding, ionic erosion or photobleaching. The last of these techniques, which requires the guiding middle layer to have a photosensitive refractive index, is preferred by those skilled in the art.

This all supposes that the polymers employed have an absorption and indices which are adjustable and controlled, preferably by photobleaching, and stable over time and to temperature.

Further details and explanations on the use of polymers for the manufacture of optical and opto-electronic waveguides may be obtained by consulting the work "Polymers for Lightwave and Integrated Optics", L. A. HORNACK, published by M. DECKKER, N.Y. (1992), or else the article by C. C. TENG, Appl. Phys. Lett., 60 (13), 1538, (1992).

It is further known that, to be active in NLO, which is equivalent to having a non-zero or even high first-order non-linear susceptibility, and hence to be able to be used in opto-electronic components of the electro-optical modulator type, the hyperpolarizable chromophores must be orientated non-centrosymmetrically in the matrix.

This is generally effected by polarizing the film under a high electric field at a temperature close to the glass transition temperature (Tg). The orientation induced by this process is then frozen by cooling with the field applied.

The orientated film obtained is not in its equilibrium state and tends to become disorientated, limiting the life of the opto-electronic component.

As the film can warm up during storage or during the steps involving soldering or deposition of the metallic layers, the heat stability of the orientation of the chromophores is a crucial characteristic of the polymer.

For further details on these theoretical questions, reference may be made to the work by D. S. CHEMLA and J. ZYSS: "Non-linear optical properties of organic molecules and crystals", Academic Press, 1987, or the work by L. A. HORNACK cited above.

Thus optical and optically non-linear polymers must satisfy four types of requirement (specifications) before they can be used in applications in linear optics and opto-electronics.

1°—The polymers must possess the following functional properties:

an absorption and refractive indices which are perfectly controlled and adjustable, preferably by UV photobleaching (waveguides), high first-order and second-order non-linear susceptibilities.

2°—These functional properties must be adjustable to a variety of particular applications without radical and elaborate modification of the synthesis.

3°—These functional properties must be constant over time and stable towards temperature so as to ensure that the material has a sufficiently long life. Advantageously, an optically non-linear polymer must have inter alia a good stability of the orientation of the dipoles at the highest temperatures encountered in the process for the manufacture of the opto-electronic component.

4°—The polymers must have processing properties which enable the opto-electronic components to be manufactured easily by the standard processes known to those skilled in the art.

These processing properties are especially:

insolubility after deposition in a thin layer, good adhesiveness of the polymer in one layer with the other, adjacent layers, easy and reproducible polarization by a simple and reliable process.

Numerous macromolecular structures have been proposed in a vain attempt to satisfy all these requirements 1 to 4 simultaneously.

An example which may be mentioned in the field of polymers used in optics is the polycarbonate described in the article by T. KUVOKAWA et al. (Applied Optics, 1980, 19, 3124). Although transparent, these polymers are not very suitable for the interconnection of electronic components because they are soluble and insufficiently heat-stable.

Polyimides of the type marketed under the name PI 25 66 by DUPONT DE NEMOURS and under the name "PRO-BIMIDE 400" by CIBA-GEIGY, which are described respectively in the publications by R. REUTER et al. (APPLIED OPTICS—1988, 27, 4565) and K. K. CHAKRAVORTY et al. (SPIE, vol. 1389, Int. Conf. Adv. in interconnection and packaging—1990, 559), although insoluble after curing, are characterized in that their refractive index is not finely adjustable. Furthermore, these polymers are poorly suited to photobleaching.

An example which may be mentioned in the field of optically non-linear polymers is the article by C. YE et al., "Macromolecules", 20, 22–23, 1987, and U.S. Pat. No. 4,750,730, which describes a family of polymers functionalized for NLO by the covalent grafting of hyperpolarizable molecules.

Patent application EP 0 363 237 describes a family of polyurethanes functionalized by the covalent grafting of hyperpolarizable groups directly onto the main chain. These polymers have more or less the correct functional properties. The matrices used have a good transparency in the near infrared. However, the stability of these functional properties over time is inadequate because the glass transition temperatures of these materials are 130 and 145° C. respectively.

Patent application FR 2 630 744 discloses polyacrylate copolymers in which the comonomers each carry a pendent side-chain. For one of the comonomers this pendent side-chain possesses a chromophoric functional group, whereas for the other comonomer the functional group of the pendent side-chain is cross-linking. The coexistence of these two functional groups in side-chains hinders the expression of each group (bulk). In addition, the glass transition temperature of these copolymers is too low. Finally, said copolymers do not satisfy requirement no. 4, in particular, of the abovementioned specifications. In fact, the slightest modification to the nature of the chromophoric and/or crosslinking comonomers changes the reactivities and therefore upsets the synthesis.

Patent application WO 91/03 001 and patent application EP 0 478 480 respectively propose polyimide and bismaleimide thermocrosslinked structures which seem to have a satisfactory insolubility and a satisfactory stability of the functional properties.

Nevertheless, these polymers are particularly difficult to process. In fact, their polarization must preferably be effected at a temperature close to their glass transition temperature. Now, the latter has the disadvantage of increasing with the imposed polarization temperature, so it is necessary to use a complex polarization protocol in which the polarization temperature and polarization field are varied with time.

Apart from this processing disadvantage, these crosslinked polymers can crack. Now, it is known that for certain applications it is useful for the polymer layer to be relatively thick (from 5 to 7 microns) so as to facilitate the connection of the component with a monomode silica fiber. It is sometimes found that, for such thicknesses, the crosslinked polymers of the above patents crack on cooling.

The technical field in question therefore lacks an optical polymer which on the one hand possesses properties in optics and/or non-linear optics which are of a satisfactory level and stable, and on the other hand can be converted to a crosslinked product of good mechanical strength which is adhesive and insoluble after shaping.

In this technical environment, one of the essential objects of the present invention is to propose novel optical polymers which are capable of being used as raw materials in the manufacture of optical and/or opto-electronic devices, and which possess, inter alia and simultaneously, all the intrinsic properties corresponding to requirements 1 to 4 mentioned above.

To achieve this and other objects, the Applicant has succeeded in providing, totally surprisingly and unexpectedly, a novel family of crosslinkable polymers which can be used especially in optics and non-linear optics and of which the ends of the polymer chains are functionalized by reactive groups of a different type from those predominantly used for polymerization and the preparation of the polymer skeleton.

DESCRIPTION OF THE INVENTION

The present invention consequently relates tocrosslinkable polymers for use in optics and non-linear optics, which comprise at least one chromophore and are characterized in that they have, on at least two of their ends, at least one reactive end group of a different chemical type from the group predominantly used in polymerization and the preparation of the polymer skeleton.

These novel polymers, which can be qualified as telechelic, perfectly satisfy the abovementioned specifications. In fact, this class of optical and/or optically non-linear polymers simultaneously possess the advantages of crosslinked networks and the advantages of thermoplastic systems.

They preserve the following properties of crosslinked systems:

dielectric strength, stability of the functional properties with time and temperature, insolubility.

They have the following properties of thermoplastic systems:

- possibility of fine adjustment of the functional properties (index, absorption, non-linear susceptibility),
- good processing properties (polarization, interlayer adhesion),
- good cracking resistance.

These results are surprising as there was nothing to suggest, a priori, that simple functionalization of the ends of the polymer skeleton would make it possible to have a sufficient number of reactive groups to achieve a suitable level of crosslinking while at the same time providing the material with properties 1 to 4 mentioned above.

According to the invention, the expression "reactive end group" denotes any chemical group capable of generating one or more bonds, preferably covalent bonds, and thus making it possible to join the polymer skeleton in question to another chemical entity, which can consist especially of another polymer skeleton of the same type.

More precisely, terminal reactivity is understood here as meaning an aptitude for crosslinking so as to form a cohesive network of optical polymers without thereby affecting the optical properties expected for these polymers.

In a preferred mode of carrying out the invention, each reactive end group comprises at least one C—C, C—N, C—S, S—S or N—S double bond and/or triple bond, and/or an epoxy and/or thiol group or a derivative of said groups.

Advantageously, the reactive end group according to the present invention has the following formula:

$$R-\underset{R'}{\underset{|}{C}}=CH-CO-\underset{|}{N}- \quad (A)$$

in which:

Y' is H, $CH_3$ or Cl, the radicals R are independently a hydrogen atom or optionally substituted, low-molecular (from $C_1$ to $C_6$) alkyl or alkylidene radicals, and R' is independently an optionally substituted $C_1$ to $C_6$ acyl group or an optionally substituted and/or unsaturated $C_1$ to $C_6$ acylidene group, R and R' advantageously being joined together to form a 5- to 7-membered heterocycle.

The radicals R and R' are preferably chosen so that formula (A) becomes (B) formula $$\begin{array}{c} HC-CO \\ \| \quad \quad \searrow \\ \quad \quad \quad N- \\ \| \quad \quad \nearrow \\ Y'-C-CO \end{array} \quad (B)$$

in which Y' is as defined above.

In practice, the reactive end group is selected for example from the following list of groups: maleimide, nadimide, acrylic, methacrylic, acrylamide, vinyl, styryl, allyl, silyl, cyanate, isocyanate, thiocyanate, cyanamide, nitrile, epoxy, acetylene or the like, as well as derivatives thereof.

Inasmuch as they differ from the predominant polymerization group in the polymer skeleton, it being understood that the term "predominantly" refers to a mol percentage, the reactive end groups can be identical or different at each end of the polymer in question. In fact, it may be of value to have two different crosslinkable groups in order to adapt the crosslinking characteristics to the chosen application (crosslinking in two stages, for example).

From a quantitative point of view, it has been possible to determine, according to the invention, that the numerical molar ratio $$\frac{\text{reactive end groups}}{\text{elementary polymerization groups of the polymer skeleton}}$$

is advantageously between 0.004 and 0.5, preferably between 0.004 and 0.4 and even more preferably between 0.04 and 0.2.

As far as the polymer skeleton is concerned, it can have a variable structure: linear, branched, arborescent, "arachnoid", etc.

This polymer skeleton advantageously comprises polymerization groups selected from at least one of the following groups: urethane, ester, amide, ether, carbon-carbon, imide, sulfide, silane and siloxane. Urethane and ester groups are particularly preferred.

It is self-evident that it is entirely possible to envisage combining several of the abovementioned polymerization groups in order to obtain a copolymer skeleton according to the invention.

The chromophore of these optical polymers can be introduced either via a monomer or structure carrying two polymerization groups, or via a pendent group joined to the polymer skeleton by one or more bonding bridges.

The chromophore can be any organic group active in NLO, as defined and exemplified in the article by H. E. KATZ, C. W. DIRK, K. D. SINGER, T. E. SOHN, "Mol. Cryst. Liq. Cryst. inc. non lin. opt." (1988), 157, 525, and in the French patent applications having the following numbers: 88-05 214, 88-12 028, 88-12 079, 88-12 080, 89-02 271, 89-04 232, 89-05 870, 89-10 696, 89-10 197, 89-00 377, 90-00 575, 90-02 336, 90-05 420.

Particular mention may be made of the chromophores of the following general formula: $E-Z_1-X=Y-Z_2-N$, as described in French patent application 2 667 315, and chromophores of the diazo type, stilbene type (cf. U.S. Pat. No. 4,757,130) or alkyne type (cf. U.S. Pat. No. 4,603,187).

Finally, the chromophore can be selected from azobenzene or stilbene units or derivatives thereof, or else polyene units. In this last family of units, the compound of the following formula is particularly preferred:

DCM—OH

According to an advantageous provision of the invention, the polymer has a molecular weight of between 1000 and 500,000 D, preferably of between 1000 and 100,000 D and even more preferably of between 1000 and 50,000 D.

The present invention further relates to the polymers having the structures described above and presented in crosslinked form.

The crosslinked polymers comprise bridges consisting solely of reactive end groups of different polymer chains and, if appropriate, bridges formed by a crosslinking auxiliary joining at least two reactive end groups.

The following may be mentioned as examples of crosslinking auxiliaries:

ethylene glycol diacrylate,
ethylene glycol dimethacrylate,
ethylene glycol cyanoacrylate,
ethylene glycol bis(4-maleimidobenzoate),
ethylene glycol bis(nadimidobenzoate),
ethylene glycol bis(benzocyclobutene-1-carboxylate),
ethylene diacrylamide,
divinylbenzene,
phenyl diisocyanate,
phenylene diisothiocyanate,
polyvinylsilane,
N-vinylpyrrolidinone,
4,4'-diaminodiphenylmethane,
4,4'-dimaleimidodiphenylmethane, etc.

In a first mode of synthesizing the polymers according to the invention, a terminating agent carrying a given reactive end group is used. This terminating agent is a chromophoric or non-chromophoric monomer monofunctionalized by the reactive end group. In less than the stoichiometric amount relative to the polymerization monomers which are intended to form the polymer skeleton, this terminating agent can be added at various times during the polymerization reaction (method A).

In a second mode of synthesizing the polymers according to the invention, the first step is to produce the polymer skeleton from monomers which may or may not consist of chromophores, and this is then followed directly by the grafting of at least one reactive end group onto at least two of the ends of the polymer skeleton without passing via a (co)monomer carrying said end group (method B).

In both these modes of synthesis, it is optionally possible to attach chromophores to the polymer skeleton at a later stage.

POSSIBILITY OF INDUSTRIAL APPLICATION

The crosslinkable polymers according to the invention are materials which can be shaped (films) and then crosslinked for subsequent use in optical devices such as waveguides or opto-electronic devices, for example switches, modulators, directional couplers and flip-flops. The adjustability of the refractive index in optics and the high and stable activity in NLO are among the essential advantages of the polymers according to the invention.

Furthermore, the polymers of the invention simultaneously possess the advantages of crosslinked networks (dielectric strength, stability of the functional properties with time and temperature, insolubility) and those of thermoplastic polymers (possibility of fine adjustment of the functional properties, ease of processing, low degree of cracking).

Another great asset of the polymers of the invention results from the possibility of independent modulation of at least one of the characteristics belonging to at least one of the three groups of properties they possess:

1°—functional properties,
2°—stability of these functional properties,
3°—adjustability of these functional properties,
4°—processing properties.

Thus, for a given application, it is possible to envisage modifying the transparency or the Tg, for example, by introducing the necessary functional group: substitution of the ester polymerization group (Example 17) for the urethane group (Example 16) improves the transparency at 1320 nm and 1550 nm without affecting the other specifications of the polymer.

BEST MODE OF CARRYING OUT THE INVENTION

Other advantages, details of implementation and variants of the invention will become more clearly apparent from the Examples which are given below solely by way of indication.

EXAMPLES

By convention, a telechelic polymer denoted for example as polyurethane/maleimide hereafter is a polymer whose skeleton is a polyurethane and whose ends are reactive end groups of the maleimide type.

SYNTHESIS OF THE MONOFUNCTIONALIZED CHROMOPHORES USED FOR THE SYNTHESIS OF THE TELECHELIC POLYMERS

Example 1

Chromophore 1

25.1 g of Disperse Red 17 (VILMAX) (DR17) are dissolved in 400 ml of dry dichloromethane and the solution is cooled by means of an ice bath. 19 g of maleimidobenzoyl chloride and 7 g of pyridine dried beforehand over a sieve are added. The solution is left to return slowly to room temperature and stirred for several hours. The solution is filtered and the product is precipitated in methanol. The target monosubstituted product is purified (removal of the DR17 residues and disubstituted product) by washing with ethanol and several recrystallizations.

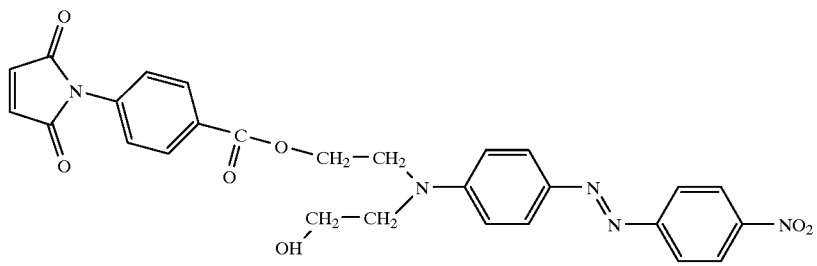

(1)

Example 2

Chromophore 2

3 mmol (0.942 g) of Disperse Red 1 (VILMAX) (DR1) are dissolved in 80 ml of dry dichloromethane. The solution is cooled and 4 mmol of acryloyl chloride (0.362 g) and a stoichiometric amount of dried pyridine are added dropwise. The solution is stirred, the mixture being left to return to room temperature. When the reaction is complete, the mixture is filtered and the product is precipitated in ether.

It is then rinsed, dried and subsequently recrystallized.

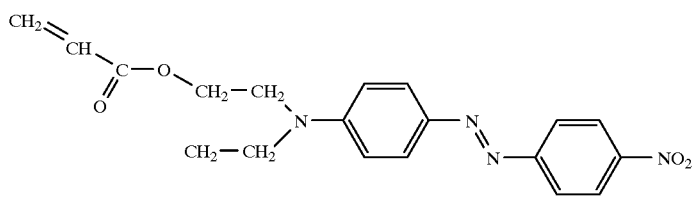

(2)

Example 3

Chromophore 3

3 mmol (1.03 g) of DR17 are dissolved in dichloromethane. The solution is cooled in an ice bath and 3 mmol of acryloyl chloride (0.270 g) and a stoichiometric amount of pyridine are added. The solution is stirred for several hours. The product is precipitated in methanol, dried and recrystallized several tines.

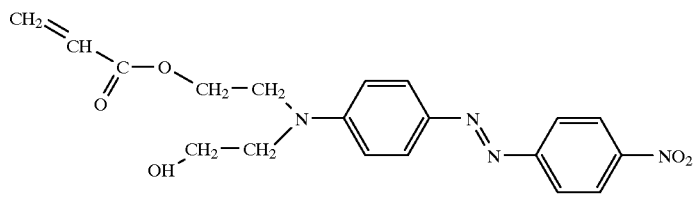

(3)

Example 4

Chromophore 4

3 mmol (1.03 g) of DR17 are dissolved in dichloromethane. The solution is cooled in an ice bath and 3 mmol of 4-vinylbenzoyl chloride (0.270 g) and a stoichiometric amount of pyridine are added. The solutionis stirred for several hours. The product is precipitated, dried and recrystallized several times.

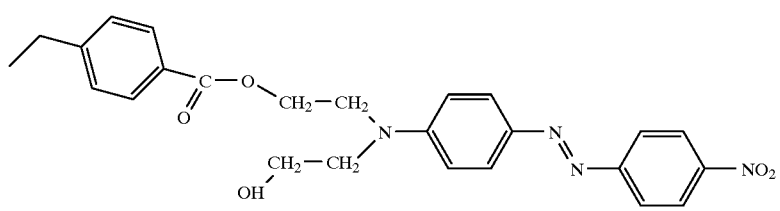

(4)

Example 5

Chromophore 5

10 mmol of the compound a shown below are dissolved in acetone. 10 mmol of BrCN and a stoichiometric amount of triethylamine are then added according to the procedure described by FYFE et al. ("Macromolecules", 25, 6289, 1992).

6.5 mmol of the chromophore 5 shown below are obtained after precipitation and recrystallization from an acetone/heptane mixture.

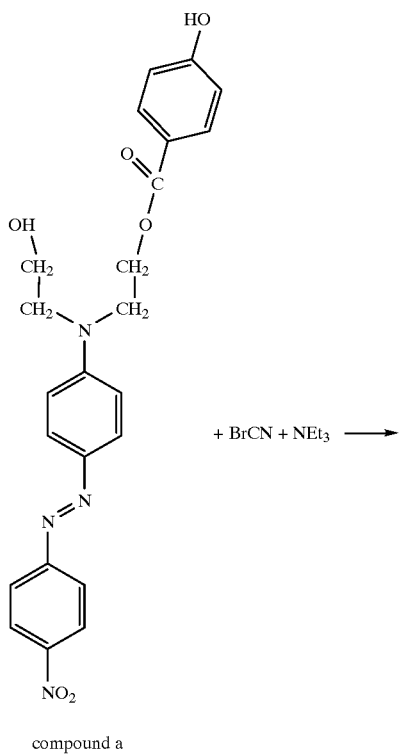

compound a

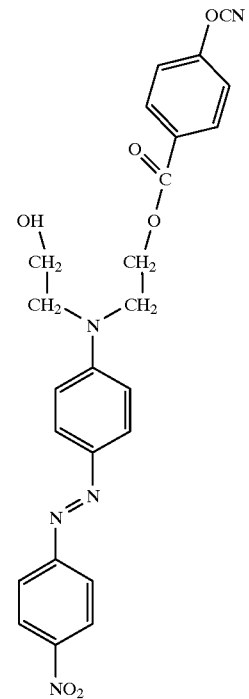

Chromophore 5

SYNTHESIS OF THE TELECHELIC POLYMERS

Example 6

Synthesis of a Maleimide-Terminated Polyurethane

Method A.

1.54 grams of chromophore DR17 (4.48 mmol) are introduced into a 50 ml three-necked flask and 10 ml of dimethylacetamide (DMAC) are introduced under nitrogen. The solution is heated to 60° C. and a slight excess of tolyl diisocyanate (5 mmol, 0.87 g) is added. After six hours of synthesis, 0.275 g of the chromophore 1 (0.52 mmol) is added. The solution is stirred overnight. The next day, the polymer is precipitated in methanol and the powder is dried under vacuum and then redissolved in THF for reprecipitation in cyclohexane.

Analyses by nuclear magnetic resonance (NMR), gel permeation chromatography (GPC), thermogravimetric analysis (TGA) and differential scanning calorimetry (DSC) confirm the structure of the polymer obtained:

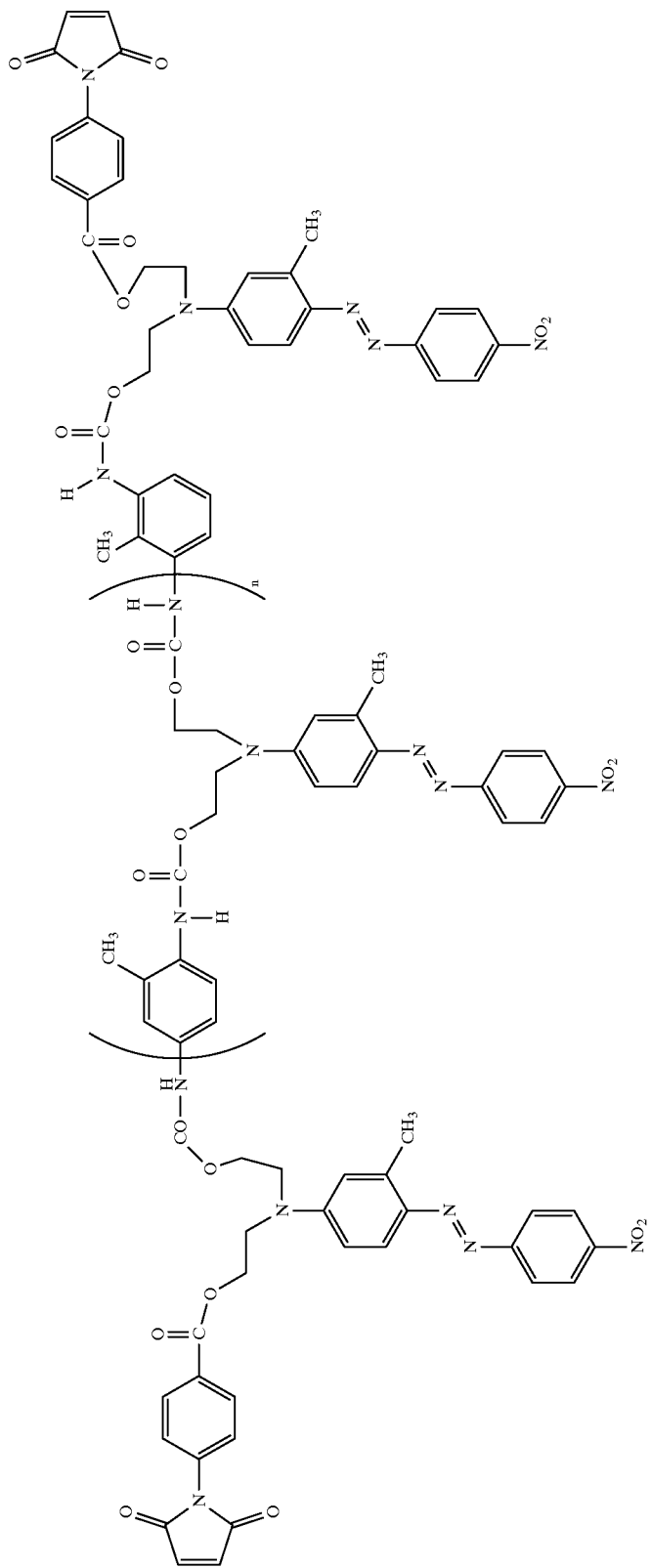

$3 \leq n \leq 8$.

A film obtained by spin coating from a solution in DMAC is studied. The Tg of the soluble polymer film is 96° C. After a 4-hour heat treatment at 180° C., the film is insoluble and its Tg is 178° C.

Example 7

Synthesis of a Maleimide-Terminated Polyurethane

Method B.

1.54 grams of DR17 (4.48 mmol) are introduced into a 250 ml three-necked flask and 10 ml of dimethylacetamide (DMAC) are introduced under nitrogen. The solution is heated to 60° C. and 0.8 mol equivalent of tolyl diisocyanate (3.59 mmol, 0.65 g) is added.

After four hours of synthesis, maleimidobenzoyl chloride (0.8 mmol) and a stoichiometric amount of pyridine are added. The solution is left at room temperature and stirred overnight. The next day, the polymer is precipitated in methanol and the powder is dried under vacuum and then redissolved in THF for reprecipitation in cyclohexane.

Analyses by NMR, GPC, TGA and DSC confirm the structure of the polymer obtained. It is identical to that of the polymer of Example 6.

This polymer (maleimide-terminated polyurethane) satisfies numerous conditions of use: stable Tg affordingeasy polarization cycles, insolubility, high orientation stability, transparency at 1320 nm, ease of synthesis.

The possibility of easily exchanging the chromophore involved in the synthesis of the polymer skeleton is illustrated in the following Examples (from 8 to 16). Method B was used for these different products.

Example 8

Synthesis of a Maleimide-Terminated Polyurethane With a Stilbene-Type Derivative The synthesis of 4-(N,N-dihydroxyethylamino)-4'-nitro-stilbene (DHANS) is described in patent WO 91/03 001 and U.S. Pat. No. 4,757,130. 1.5 grams of DHANS (4.48 mmol) are introduced into a 50 ml three-necked flask and 10 ml of dimethylacetamide (DMAC) are introduced under nitrogen. The solution is heated to 60° C. and 0.8 mol equivalent of tolyl diisocyanate (3.59 mmol, 0.65 g) is added. After four hours of synthesis, maleimido-benzoyl chloride (0.8 mmol) and a stoichiometric amount of pyridine are added. The solution is left at room temperature and stirred overnight. The next day, the polymer is precipitated in propanol and the powder is dried under vacuum and then redissolved in THF for reprecipitation in ether.

Analyses by NMR, GPC, TGA and DSC confirm the structure of the polymer obtained:

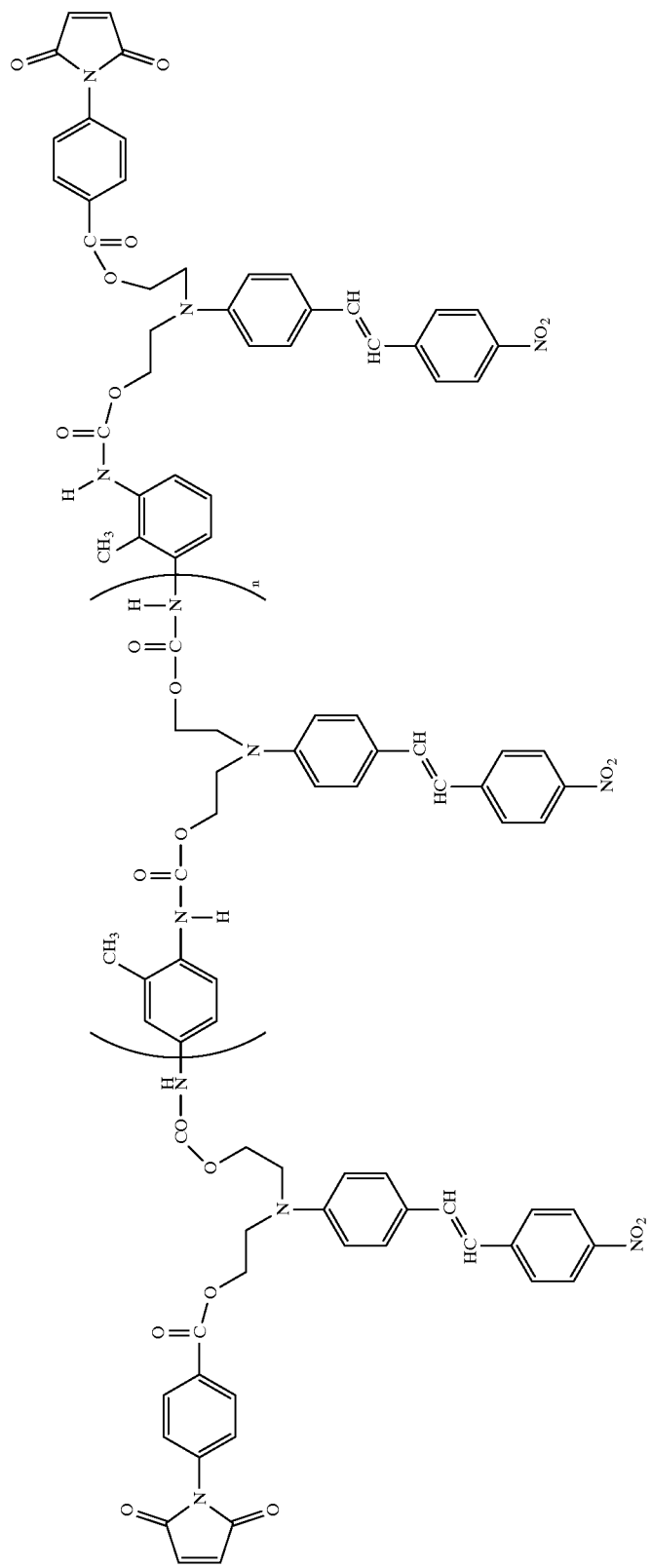

A solution of this polymer can be converted to film by spin coating. The film obtained has a Tg of 103° C. After a 4-hour heat treatment at 180° C., the film has become insoluble and its Tg is now 183° C.

Example 9

Synthesis of a Polyurethane/Maleimide with 4-Dicyanomethylene-2-Methyl-6-p-Diethanol-Aminostyryl-4H-Pyran (DCM-OH)

DCM-OH is a laser dye whose synthesis is described by J. BOURSON et al. in the article Optics Communication, 72 (6), 367, 1989. These authors do not mention NLO properties associated with this molecule, which is shown below:

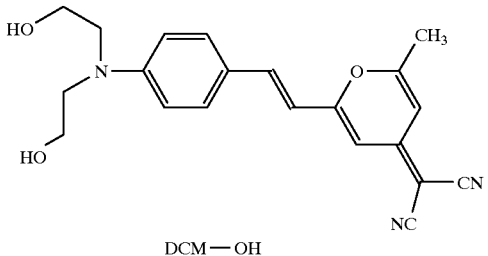

DCM—OH

Functionalization makes it possible to synthesize a polyurethane, for example. 4.48 mmol of DCM-OH are introduced into a 50 ml reactor and 10 ml of dimethylacetamide (DMAC) are introduced under nitrogen. The solution is heated to 60° C. and 0.8 mol equivalent of tolyl diisocyanate (3.59 mmol, 0.65 g) is added. After four hours of synthesis, maleimidobenzoyl chloride (0.8 mmol) and a stoichiometric amount of pyridine are added. The solution is left at room temperature and stirred overnight. The next day, the polymer is precipitated in ethanol and the orange powder is dried under vacuum and then redissolved in THF for reprecipitation in ethanol.

The structure of the polymer, confirmed by DSC, NMR, GPC and TGA, is as follows:

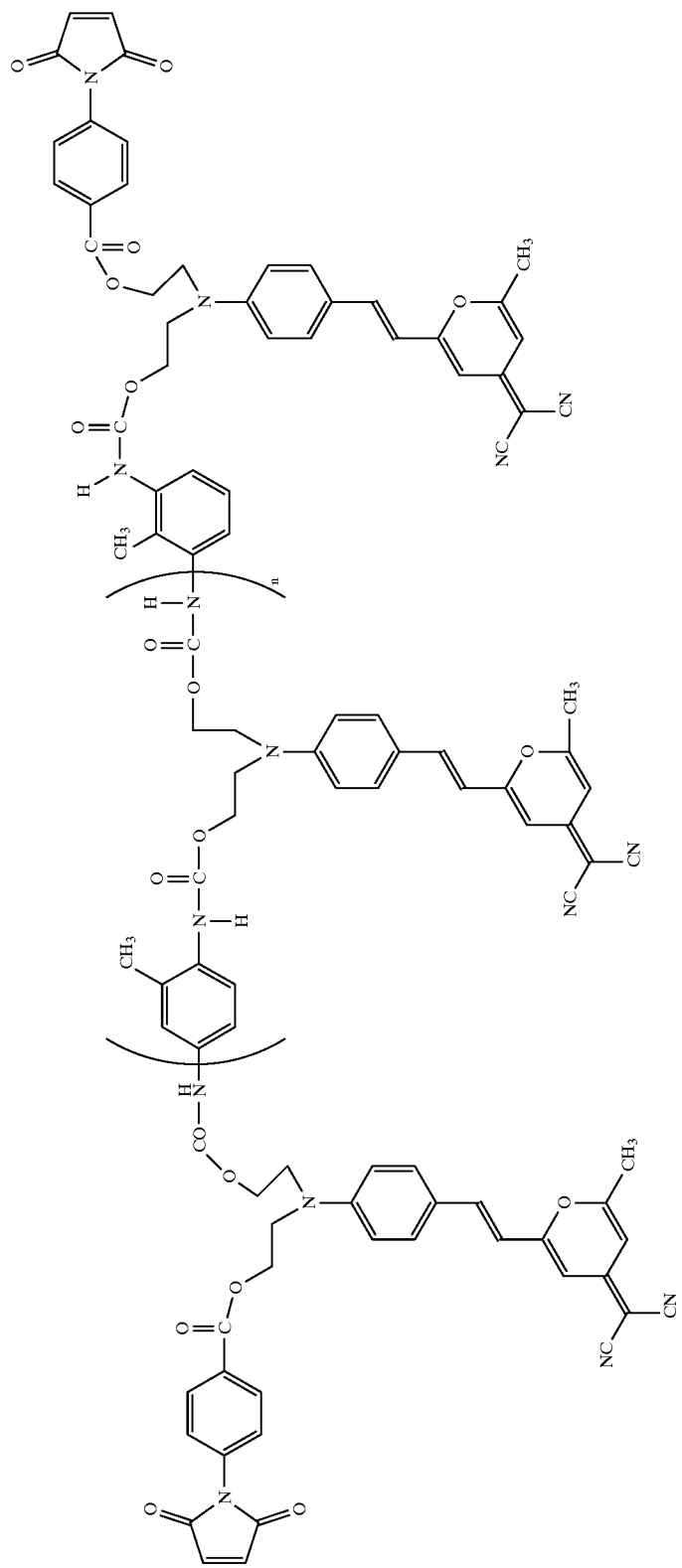

A film obtained by spin coating from a solution in DMAC is crosslinked. The Tg of the soluble polymer film before crosslinking is 90° C. After a 4-hour heat treatment at 180° C., the film has become insoluble and its Tg is 175° C.

Example 10

Synthesis of a Copolyurethane/Maleimide With 3-Dicyanomethylene-5,5-Dimethyl-1-(p-Diethanolaminostyryl)Cyclohexene The synthesis of the dye is described in U.S. Pat. No. 4,985,528, which relates to polymers for non-linear optics. The formula of the dye is as follows:

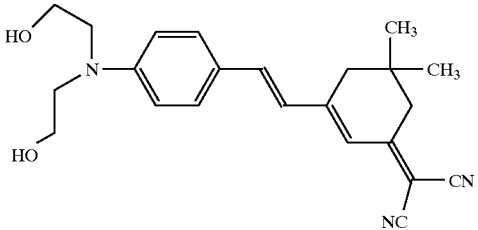

A telechelic copolymer can be obtained on the basis of the synthesis described in Example 6. 4.48 mmol of 3-dicyanomethylene-5,5-dimethyl-1-(p-diethanolaminostyryl)cyclohexene and 2.02 mmol of N,N-dihydroxyethyl-metatoluidine are introduced into a 250 ml reactor and 10 ml of dimethylacetamide (DMAC) are introduced under nitrogen. The solution is heated to 60° C. and 0.8 mol equivalent of tolyl diisocyanate (5.2 m-mol) is added. After four hours of synthesis, maleimidobenzoyl chloride (0.8 mmol) and a stoichiometric amount of pyridine are added. The solution is left at room temperature and stirred overnight. The next day, the polymer is precipitated in methanol and the claret-colored powder is dried under vacuum and then redissolved in acetone for reprecipitation in ether.

The structure of the polymer, confirmed by DSC, NMR, GPC and TGA, is as follows:

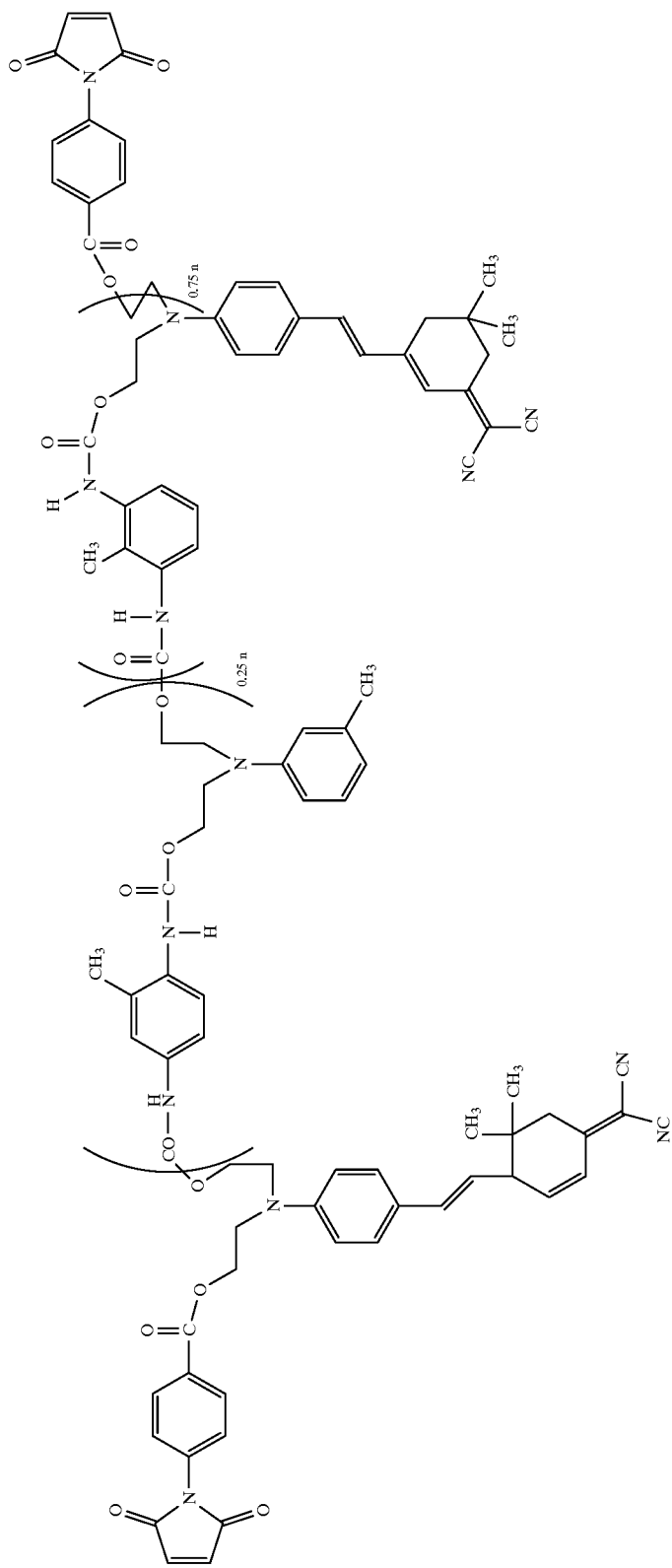

A film obtained by spin coating from a solution in DMAC is crosslinked. The Tg of the soluble polymer film before crosslinking is 115° C. After a 4-hour heat treatment at 180° C., the film has become insoluble and its Tg is 185° C.

Example 11

Synthesis of a Polyurethane/Maleimide with a Pyridinium-Type Chromophore

This type of chromophore is already used as an active molecule in polymers with properties in non-linear optics. A description of the properties and synthesis of this active molecule can be found in the article by MARDER S. R. et al., Science, 245, p. 626, 1989. The telechelic polymer is obtained by following the procedure given above, i.e. 4.5 mmol of this active molecule are introduced into 10 ml of dimethylacetamide (DMAC) under nitrogen. The solution is heated to 60° C. and 0.8 mol equivalent of tolyl diisocyanate (3.6 mmol) is added. The synthesis is then left to proceed for 4 h, after which maleimidobenzoyl chloride (0.8 mmol) and a stoichiometric amount of pyridine are added to the reaction medium. The solution is left at room temperature and stirred overnight. The next day, the polymer is precipitated in methanol and the orange powder is dried under vacuum and then redissolved in acetone for reprecipitation in ether.

A film obtained by spin coating from a solution in DMAC is crosslinked. The Tg of the soluble polymer film before crosslinking is 85° C. After a 4 h heat treatment at 180° C., the film has become insoluble and its Tg is 165° C.

Example 12

Synthesis of an Acrylic-Terminated Polyurethane.

1.54 grams of chromophore DR17 (4.48 mmol) are introduced into a 50 ml three-necked flask and 10 ml of dimethylacetamide (DMAC) are introduced under nitrogen. The solution is heated to 60° C. and a slight deficiency of tolyl diisocyanate (4 mmol, 0.69 g) is added. After six hours of synthesis, 0.45 g of acryloyl chloride (0.5 mmol) and a stoichiometric amount of pyridine are added. The solution is stirred at room temperature for a few hours and the polymer is then precipitated in methanol. The powder is dried under vacuum and then redissolved in THF for reprecipitation in heptane.

N.B.: Method A could be envisaged using the chromophore 3.

Analyses by NMR, GPC, TGA and DSC confirm the structure of the polymer obtained, which is shown below.

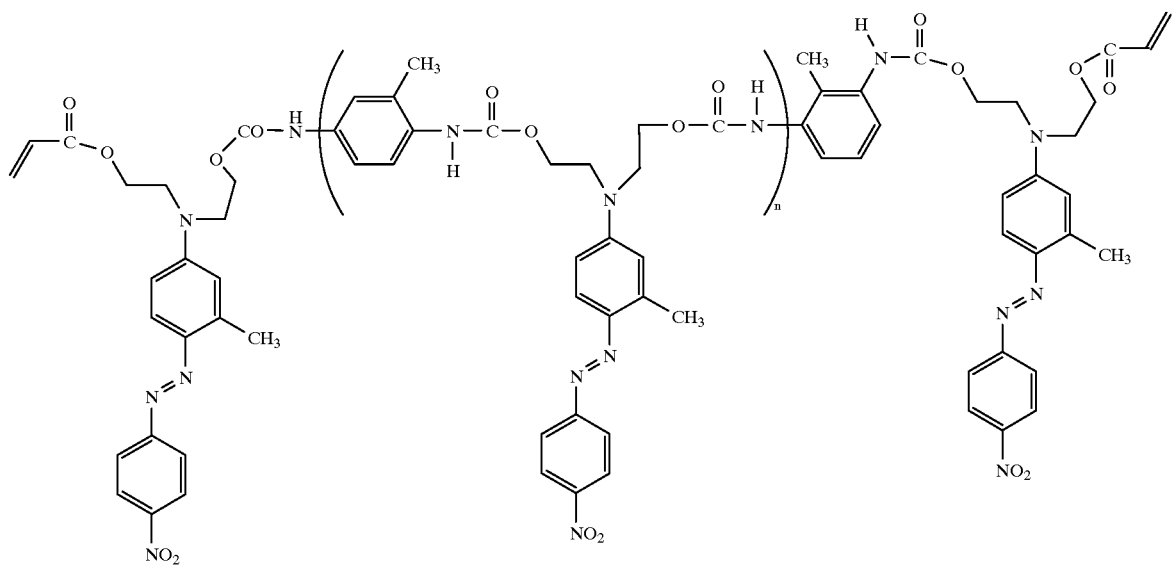

$3 \leq n \leq 8$.

A film obtained by spin coating is thermocrosslinked for 4 hours at 180° C. The Tg is 113° C. before crosslinking and 147° C. after crosslinking. The film, which is of matt appearance, is insoluble.

Example 13

Synthesis of an Acrylamide-Terminated Polyurethane 1.54 grams of chromophore DR17 (4.48 mmol) are introduced into a 250 ml three-necked flask and 10 ml of dimethylacetamide (DMAC) are introduced under nitrogen. The solution is heated to 60° C. and a slight excess of tolyl diisocyanate (5 mmol, 0.87 g) is added. After six hours of synthesis, 0.037 g of acrylamide (0.52 mmol) is added. The solution is stirred at room temperature for one hour. The polymer is precipitated in methanol, dried under vacuum and then redissolved in THF for reprecipitation in cyclohexane.

Analyses by NMR, GPC, TGA and DSC confirm the structure of the polymer obtained, which is shown below.

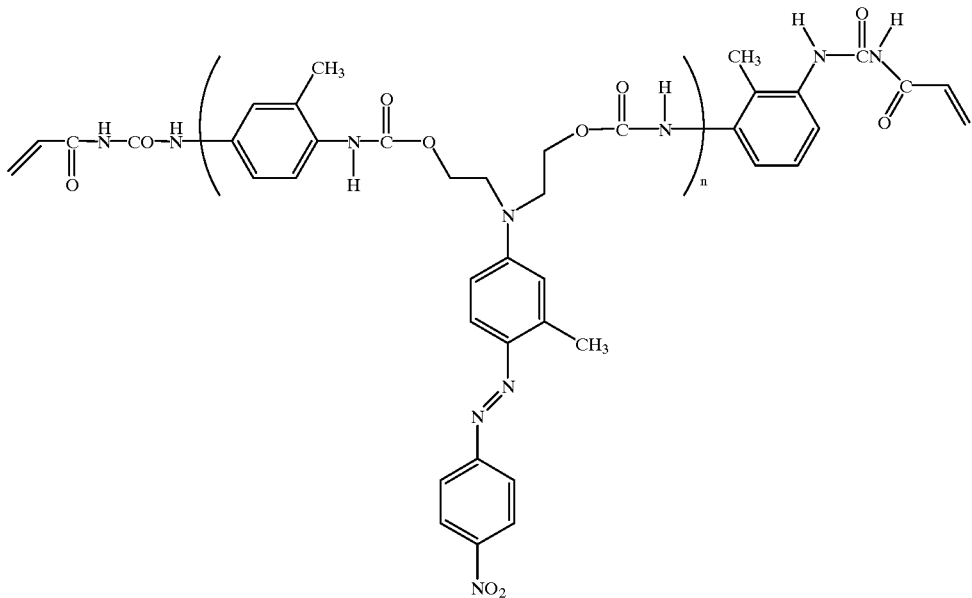

$3 \leq n \leq 8$.

Example 14

Synthesis of a Styryl-Terminated Polyurethane 1.54 grams of chromophore DR17 (4.48 mmol) are introduced into a 250 ml three-necked flask and 10 ml of dimethylacetamide (DMAC) are introduced under nitrogen. The solution is heated to 60° C. and a slight deficiency of tolyl diisocyanate (4 mmol, 0.69 g) is added. After six hours of synthesis, 0.250 g of the chromophore 4 (0.5 mmol) is added. The solution is stirred at room temperature for a few hours and the polymer is then precipitated in methanol. It is dried under vacuum and then redissolved in THF for reprecipitation in heptane.

Analyses by NMR, GPC, TGA and DSC confirm the structure of the polymer obtained, which is shown below.

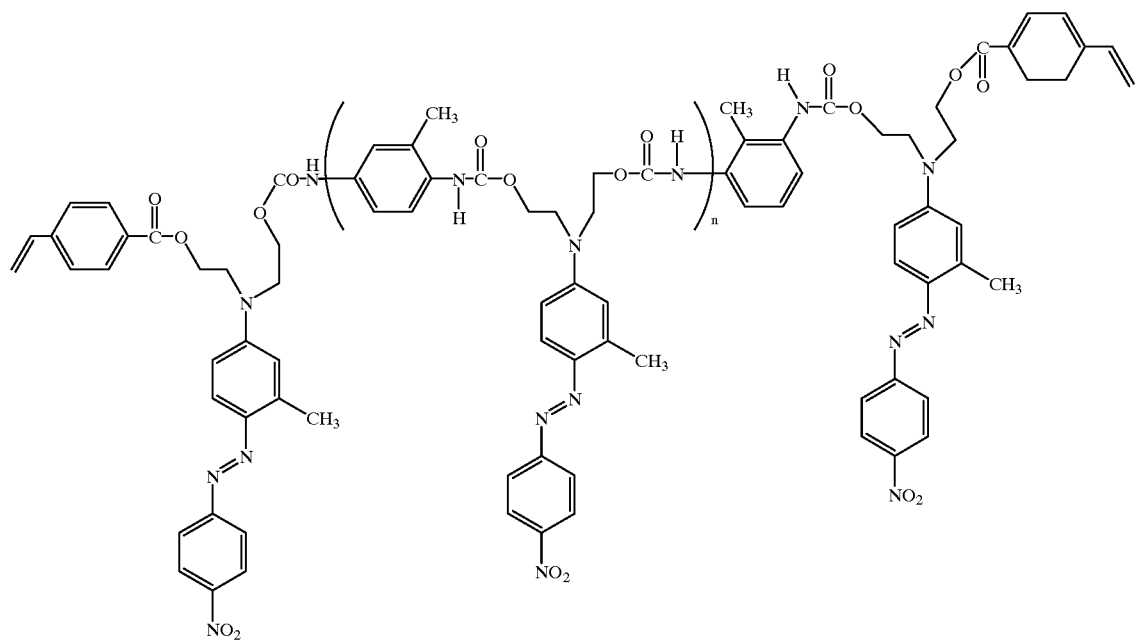

$3 \leq n \leq 8$.

Example 15

Synthesis of a Cyanate-Terminated Polyurethane

This polymer is synthesized by following the procedure of Example 12, method B. Thus the starting material is 1.54 g of DR17 dissolved in 10 ml of anhydrous DMAC. This solution is heated to 60° C. and 0.930 g (5.3 mmol) of TDI is added. After 4 h of synthesis, 0.2 mol equivalent of the chromophore 5 is added. The synthesis is continued for a few hours and the solution is then left to return to room temperature. The polymer is precipitated in acetone. The precipitate is rinsed and then dried under vacuum. Spectroscopic analyses confirm the structure of the polymer.

Example 16

Synthesis of a Maleimide-Terminated Polyurethane With the Chromophore Used In Example 10

5.3 mmol of the chromophore used in Example 10, 6.32 mmol of 1,5-naphthyl diisocyanate and 8 ml of DMAC are introduced into a 100 ml reactor. The solution is heated to 60° C. and stirred under nitrogen. After 30 min, 2.1 mmol of 4-maleimidophenol are added and the mixture is then stirred for 3 h. The polymer is recovered by precipitation in methanol and then dried under vacuum at 50° C. for 15 h.

The Tg of the soluble polymer before crosslinking is 155° C. After a 1 h heat treatment at 220° C., the polymer becomes insoluble in DMAC and its Tg is 192° C.

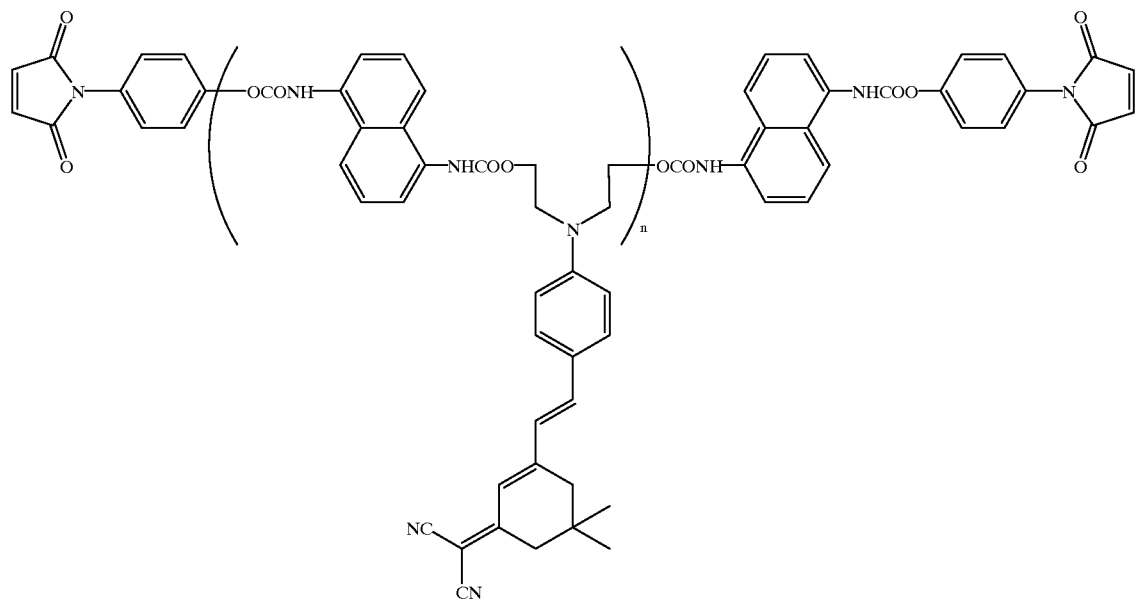

Example 17

Synthesis of a Maleimide-Terminated Polyester 1.54 grams of DR17 (4.48 mmol) are introduced into a 250 ml three-necked flask. 10 ml of anhydrous DMAC areadded under nitrogen and heated to 60° C. and an equimolar mixture of terephthaloyl dichloride and isophthalic acid, i.e. 1.78 mmol of each, is added by controlled-action syringe. Prior to this addition, a stoichiometric amount of pyridine is added to the DMAC solution. After 6 hours of synthesis, 180 mg of maleimidobenzoyl chloride, 20 mg of maleimidobenzoic acid and 65 μl of pyridine are added. The mixture is stirred overnight at room temperature. The solution is precipitated in methanol the next morning.

Analyses by NMR, GPC, DSC and TGA confirm the nature and structure of the polymer, which is shown below.

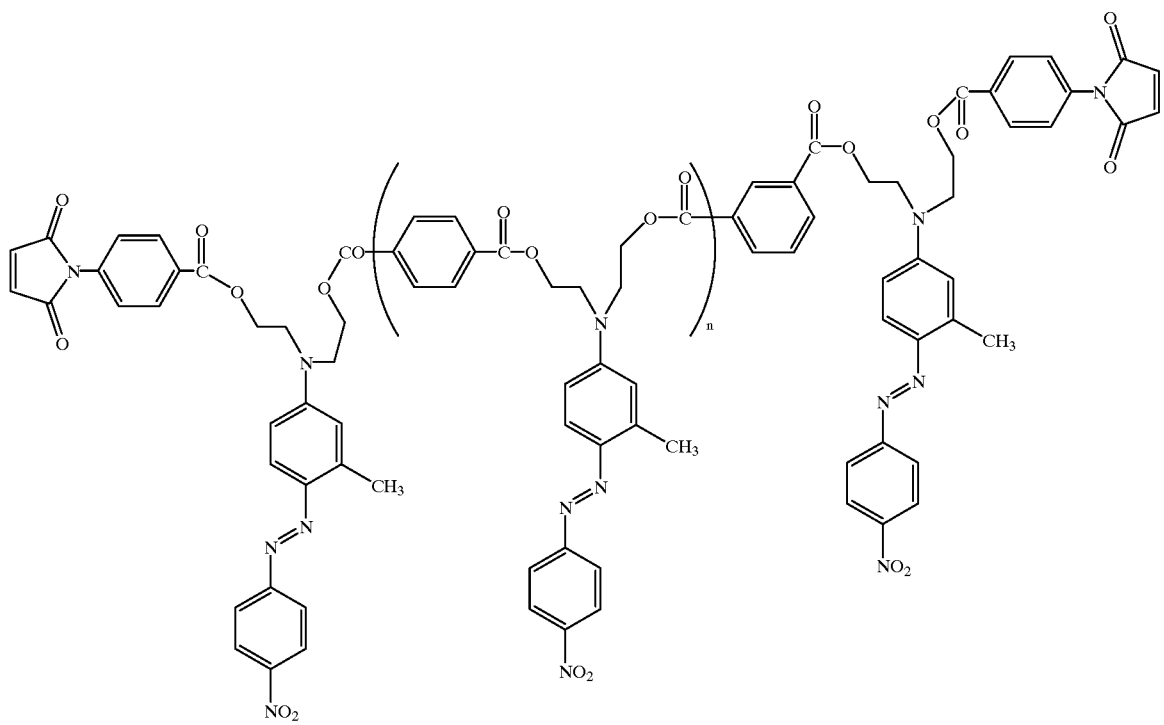

$3 \leq n \leq 8$.

A film obtained by spin coating from a 27% by weight solution in DMAC is studied. The Tg of the soluble polymer film is 125° C. After a 4-hour heat treatment at 180° C., the film is insoluble and its Tg is 135 C.

Example 18

Synthesis of a Polyester/Maleimide Using the Chromophore 1 (Method A)

The method followed is the one described for the synthesis of a polyurethane according to Example 6, method A. The polyester obtained is comparable in every respect to that of the previous Example.

Example 19

Synthesis of a Maleimide-Terminated Polyacrylate (Method B)

Such a polymer is obtained using the dyes whose syntheses are described above. 5 mmol of the chromophore 2 (1.91 g), 1 mmol of the chromophore 3 (0.4 g) and 2 mmol of methyl acrylate (0.13 g) are dissolved in 100 ml of freshly distilled dioxane kept under nitrogen. 5% by weight of AIBN (0.150 g) is added and the solution is heated to 80° C. After a few hours, a further 1% of AIBN is added and polymerization is allowed to proceed. After 6 hours, GPC shows that the polymerization is complete. 1.5 mmol (0.332 g) of maleimidobenzoyl chloride and a stoichiometric amount of pyridine are then added. The synthesis temperature is lowered to 40° C. and stirring is maintained overnight. The next day, the polymer is precipitated in heptane, washed and dried under vacuum.

Analyses by NMR, GPC, IR and DSC confirm the structure of the polymer obtained, which can be represented as follows:

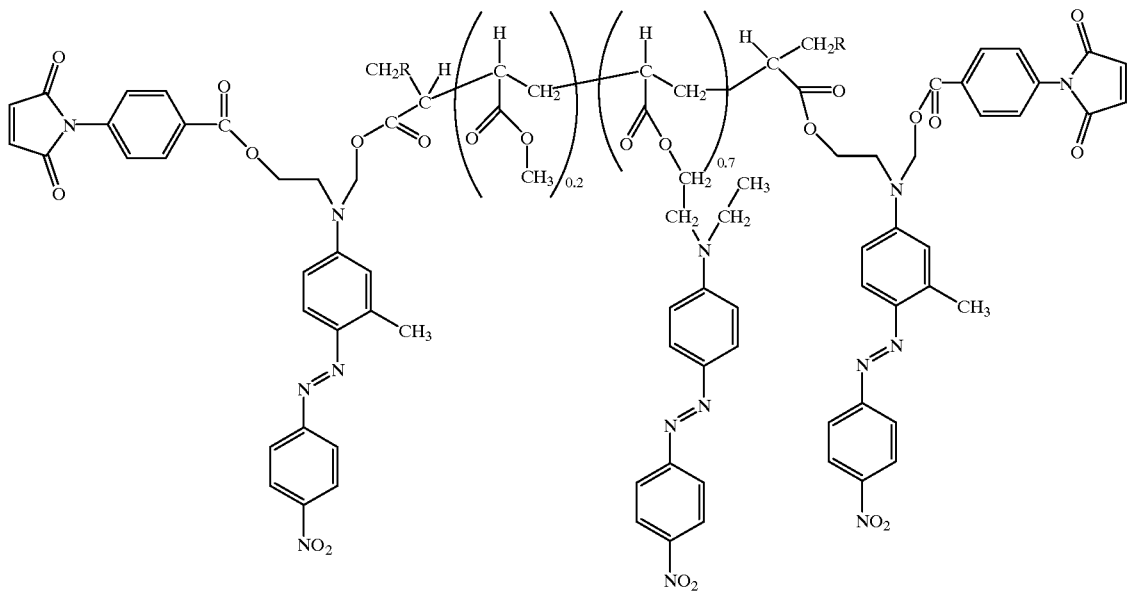

$3 \leq n \leq 8$.

A film obtained by spin coating from a 27% by weight solution in DMAC is studied. The Tg of the soluble polymer film is 75° C. After a 4-hour heat treatment at 160° C., the film is insoluble and its Tg is 120° C.

Example 20

Synthesis of a Maleimide-Terminated Polycarbonate (Method B)

1.54 grams of chromophore DR17 (4.48 mmol) are introduced into a 250 ml three-necked flask and 8 ml of dimethylacetamide (DMAC) are introduced under nitrogen. The solution is heated to 60° C. and a slight stoichiometric deficiency of triphosgene (4.0 mmol), in solution in 2 ml of DMAC, is added by controlled-action syringe. After six hours of synthesis, 0.45 g of maleimidobenzoic chloride (0.5 mmol) and a stoichiometric amount of pyridine are added. The solution isstirred at room temperature for a few hours and the polymer is then precipitated in methanol. The powder is dried under vacuum and then redissolved in THF for reprecipitation in heptane.

Analyses by NMR, GPC, TGA and DSC confirm the structure of the polymer obtained, which is shown below.

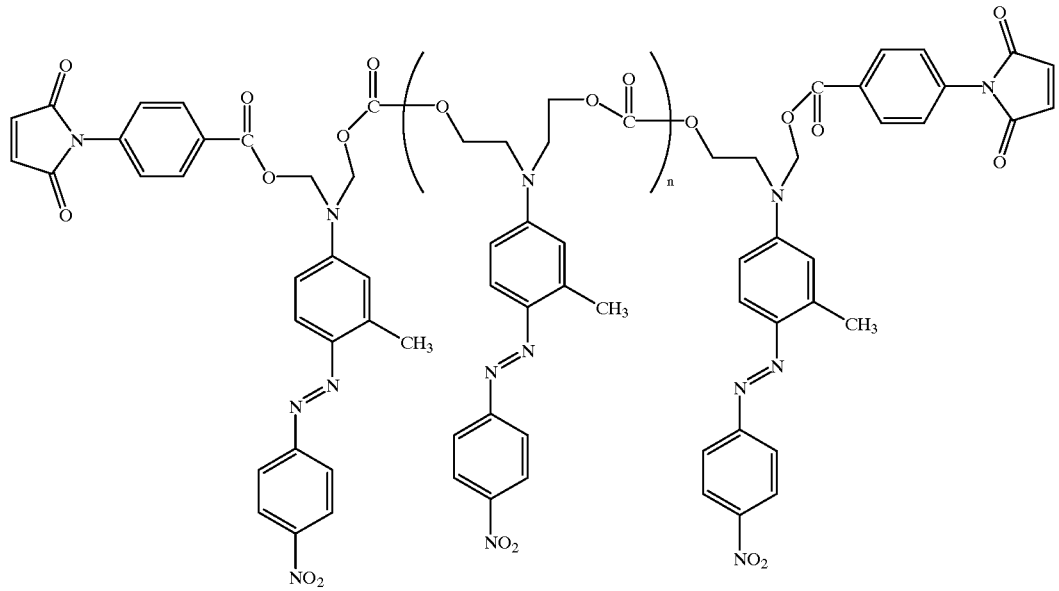

Example 21

Synthesis Of A Polysiloxane/Maleimide (Method B)

Such a polymer is synthesized on the basis of the procedure described in U.S. Pat. No. 4,230,898. Thesynthesis of (N-ethyl-N-2-enepropyl)amino-4'-cyano-biphenyl from 3-bromopropene and N-ethylamino-4'-cyano-biphenyl is known to those skilled in the art. The polymer is synthesized in two steps. First of all the chromophore is reacted with a solution of the silanol-terminated polymethyl-hydrogensiloxane in a toluene/1,2-dichloroethane mixture with 5% by weight of a catalyst (chloroplatinic acid) for 24 hours at 95° C. The solution is then precipitated in acetone and the precipitate is rinsed with ethanol. The partially functionalized polysiloxane is redissolved in THF, after which an excess of maleimidobenzoic chloride is added. The reaction is left to proceed at room temperature overnight. The next day, the polymer is recovered by precipitation in methanol and then dried under vacuum. A maleimide-terminated polysiloxane with NLO pendent groups is recovered.

The Tg of the polymer is 15° C. After a heat treatment for 2 hours at 120° C. and 2 hours at 160° C., a film of this polymer is insoluble and has a Tg of around 85° C.

Example 22

Synthesis of a Polyurethane/Maleimide Telechelic Branched Polymer (Method B)

A telechelic branched polymer is prepared from a very small percentage of multifunctional (tri-, tetra- or pentafunctional), with which all of the polymerization comonomer is reacted. This gives incipient branching points at which the polymerization reaction will proceed normally. The following example may be given: 2 g of DR17 (5.85 mmol) are dissolved in 12 ml of anhydrous DMAC under nitrogen. The solution is heated to 60° C. and 0.5 ml of a DMAC solution of the hexamethylene diisocyanate (HDI) trimer shown below is then added simultaneously (this volume corresponds to the addition of 0.25 mmol of isocyanate groups). This soluton is stirred at 60° C. for 1 hour and 4.5 mmol of TDI (i.e. 780 mg) are then added by controlled-action syringe. The solution is left to stand for 8 hours at 60° C. While the temperature is being lowered, 1.8 mmol of maleimidobenzoic chloride and a stoichiometric amount of pyridine are then added. This solution is stirred overnight. The next day, it is precipitated in methanol. The polymer is dried under vacuum. Spectroscopic analyses confirm the intended polyurethane/maleimide branched structure.

Example 23

Synthesis of a Polyurethane/Maleimide-acrylic (Method B)

1.54 g of chromophore DR17 (4.48 mmol) are introduced into a 50 ml three-necked flask and 10 ml of dimethylacetamide (DMAC) are introduced under nitrogen. The solution is heated to 60° C. and a slight deficiency of tolyl diisocyanate (4 mmol, 0.69 g) is added. After six hours of synthesis, 0.25 g of acryloyl chloride (0.25 mmol), 0.25 mmol of maleimidobenzoic chloride and a stoichiometric amount of pyridine are added. The solution is stirred at room temperature for a few hours and the polymer is then precipitated in methanol. The powder is dried under vacuum and then redissolved in THF for reprecipitation in heptane. Statistically, the polymers terminated with maleimide or acrylic at both ends are obtained in a minor proportion and the polymers terminated with maleimide-acrylic are obtained in a major proportion.

Example 24

Film Formation, Orientation and Crosslinking of a Telechelic Polymer: Example of a Polyurethane/Maleimide The polymer of Example 6 is dissolved in dimethylacetamide under a nitrogen atmosphere (20% concentration by weight). The solution obtained is filtered on a $0.2\mu$ filter and then converted to a film by the plate coating technique (1000 rpm) on a glass substrate (Corning 7059) covered with an approximately 200 Angström thick layer of gold. This gives a film of about $3\mu$. This film is predried under nitrogen at 50° C. for 5 h and then dried under vacuum at 150° C. for 16 h. A second layer of gold (200 Angströms) is deposited on the upper face of the film and constitutes the second polarization electrode.

The metallized film is then introduced, under a nitrogen atmosphere, into an optical chamber whose temperature is controlled to ±0.1° C. To crosslink the film, the temperature of the optical chamber is raised to 200° C. and kept at this value for 1 h. The Tg after crosslinking is 185° C.

The film is then heated to 190° C. and a d.c. polarization voltage Vp of 150 volts is applied for 30 min. The sample is then cooled to room temperature, the polarization voltage being maintained. The electro-optical coefficients $r_{13}$ and $r_{33}$ of the film are then measured in the optical chamber by Fabry-Pérot interferometry. This technique is described in detail by R. MEYRUEIX et al., Nonlinear Optics, vol. 1, p. 201–211, (1991), or by C. A. ELDERING et al., Journal of Applied Physics, vol. 69 (6), p. 3676–3686, (1991). This gives $r_{13}$=1.8 pm/V and $r_{33}$=6.5 pm/V.

The experiment is repeated with several samples and for different values of the polarization field. The results are collated in the Table below. The polarized films are all insoluble, do not crack and adhere perfectly to the substrate (the same characteristics are found for non-polarized and non-metallized films or films formed on other substrates).

| POLARIZATION FIELD (V/micron) | COEFFICIENT $r_{33}$ (pm/V) | COEFFICIENT $r_{13}$ (pm/V) |
|---|---|---|
| 50 | 6.5 | 1.8 |
| 75 | 10 | 2.3 |
| 100 | 15 | 3.5 |
| 130 | 20 | 4.4 |

The stability of these electro-optical coefficients is excellent and the decrease in $r_{33}$ is unmeasurable at 20° C. and even at 100° C.

In 17 h, $r_{33}$ decreases by –8% at 135° C. and –50% at 155° C.

Example 25

Film Formation, Orientation and Crosslinking of a Telechelic Polymer: Example of a Polyurethane/Maleimide The polymer of Example 10 is converted to a film and dried by the procedure described in detail in Example 24; polarization is effected in the optical chamber at 200° C. The electro-optical (EO) coefficients measured are as follows:

| POLARIZATION FIELD (V/micron) | COEFFICIENT $r_{33}$ (pm/V) | COEFFICIENT $r_{13}$ (pm/V) |
| --- | --- | --- |
| 50 | 12 | 3 |
| 75 | 18 | 4 |
| 100 | 26 | 5 |

The polymer also has the following properties:

1°—the Tg is stable after several heat treatments,

2°—the film adheres perfectly to a substrate,

3°—the film is insoluble,

4°—the stability of the electro-optical coefficients is comparable to that described in the previous Example.

Example 26

Shaping, Orientation and Characterization of a Telechelic Polymer: Example of a Polyurethane/Cyanate The polymer of Example 15 is converted to a film and dried by the procedure described in detail in Example 24. Polarization of the film is effected at 187° C. The EO coefficients obtained are as follows:

| POLARIZATION FIELD (V/micron) | COEFFICIENT $r_{33}$ (pm/V) | COEFFICIENT $r_{13}$ (pm/V) |
| --- | --- | --- |
| 50 | 8 | 2.1 |
| 100 | 19 | 4.0 |

The films characterized possess properties comparable to those of the previous Examples (Tg stable after annealing, films insoluble, do not crack, adhere to substrates, etc.).

The stability of the electro-optical coefficients is exceptional: $r_{13}$ decreases by only 10% in 17 h at 140° C.

What is claimed is:

1. A cross-linkable polymer for use in optics and non-linear optics, which comprises at least one chromophor, and wherein said polymer has on at least two of its ends, at least one reactive end group of a different chemical type from that of the group predominantly used in polymerization and the preparation of a polymer skeleton.

2. A polymer according to claim 1 wherein the reactive end group comprises at least one CC, CN, CS, SS or NS double bond and/or triple bond, and/or an epoxy group and/or a thiol group or a derivative of said groups.

3. A polymer according to claim 1 wherein the reactive end group has the following formula:

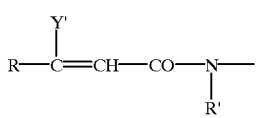

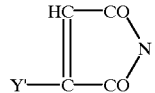

in which:

Y' is H, CH$_3$ or Cl, the radicals R are independently a hydrogen atom or optionally substituted, low-molecular (from C$_1$ to C$_6$) alkyl or alkylidene radicals, and R' is independently an optionally substituted C$_1$ to C$_6$ acyl group or an optionally substituted and/or unsaturated C$_1$ to C$_6$ acylidene group, or R and R' being joined together to form a 5- to 7-membered heterocycle group.

4. A polymer according to claim 1 wherein the reactive end group is selected from the following list of groups: maleimide, nadimide, acrylic, methacrylic, acrylamide, vinyl, styryl, allyl, silyl, cyanate, isocyanate, thiocyanate, cyanamide, nitrile, epoxy, acetylene or derivatives thereof.

5. A polymer according to claim 1 wherein the numerical molar ratio: reactive end groups/elementary polymerization groups of the polymer skeleton is between 0.004 and 0.5.

6. A polymer according to claim 1 wherein the polymer skeleton comprises polymerization groups selected from at least one of the following groups: urethane, ester, amide, imide, ether, carbon-carbon, sulfide, silane and siloxane, urethane and ester groups being particularly preferred.

7. A polymer according to claim 1 wherein the chromophore is selected from azobenzene, stilbene and bridged stilbene units.

8. A polymer according to claim 1 wherein its molecular weight is between 1000 and 500,000 D.

9. A polymer according to claim 1 wherein it is in crosslinked form.

10. A polymer according to claim 9 wherein it comprises bridges formed by a crosslinking auxiliary selected from compounds capable of reacting with the reactive end groups of the polymer.

11. A method of preparing especially the polymer according to claim 1, wherein:

a chromophore monofunctionalized by a reactive end group is prepared, and this chromophore is reacted with an identical or different chromophore carrying at least two polymerization groups.

12. A method of preparing especially the polymer according to claim 1, wherein:

the polymer skeleton is prepared from monomers which may or may not consist of a functionalized chromophore, at least one reactive end group is grafted onto at least two of the ends of the polymer skeleton, and a chromophore is optionally attached to the polymer skeleton.

13. A material, which contains the polymer according to claim 1.

14. An optical device, which is made of a material according to claim 13.

15. A polymer according to claim 3 wherein R and R' form a 5- to 7- membered heterocyclic ring having the formula 16. A polymer according to claim 5 wherein the numerical molar ratio: reactive end groups/elementary polymerization groups of the polymer skeleton is between 0.004 and 0.4.

17. A polymer according to claim 5 wherein the numerical molar ratio: reactive end groups/elementary polymerization groups of the polymer skeleton is between 0.04 and 0.2.

18. A polymer according to claim 8 wherein its molecular weight is between 1000 and 100,000 D.

19. A polymer according to claim 8 wherein its molecular weight is between 1000 and 50,000 D.

20. A cross-linkable polymer for use in optics and non-linear optics, which comprises at least one chromophor, and wherein said polymer has on at least two of its ends, at least one reactive end group of a different chemical type from that of the group predominantly used in polymerization and the preparation of a polymer skeleton;

wherein the reactive end group is selected from the group consisting of maleimide, nadimide, acrylic, methacrylic, acrylamide, vinyl, styryl, allyl, silyl, cyanate, isocyanate, thiocyanate, cyanamide, nitrile, epoxy, and acetylene; and wherein the polymer skeleton comprises polymerization groups selected from the group consisting of urethane, ester, amide, imide, ether, carbon-carbon, sulfide, silane and siloxane groups.

\* \* \* \* \*